Feb. 6, 1940. C. S. McCARTHY 2,189,268
MECHANISM CONTROL
Filed July 12, 1937 2 Sheets-Sheet 1
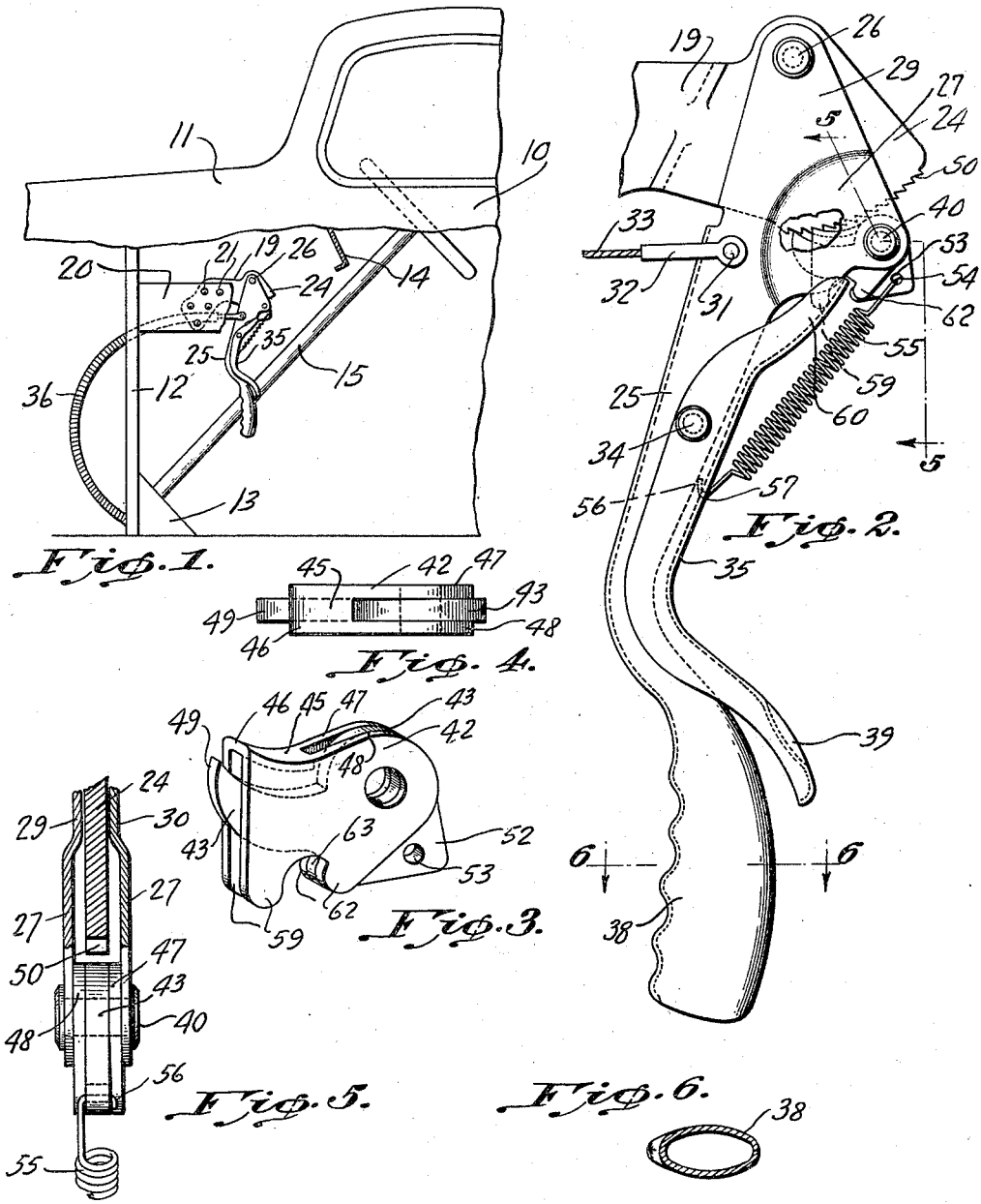
Inventor
Charles S. McCarthy
By Braselton, Whitcomb & Davies
Attorneys Feb. 6, 1940.     C. S. McCARTHY     2,189,268
MECHANISM CONTROL
Filed July 12, 1937     2 Sheets-Sheet 2
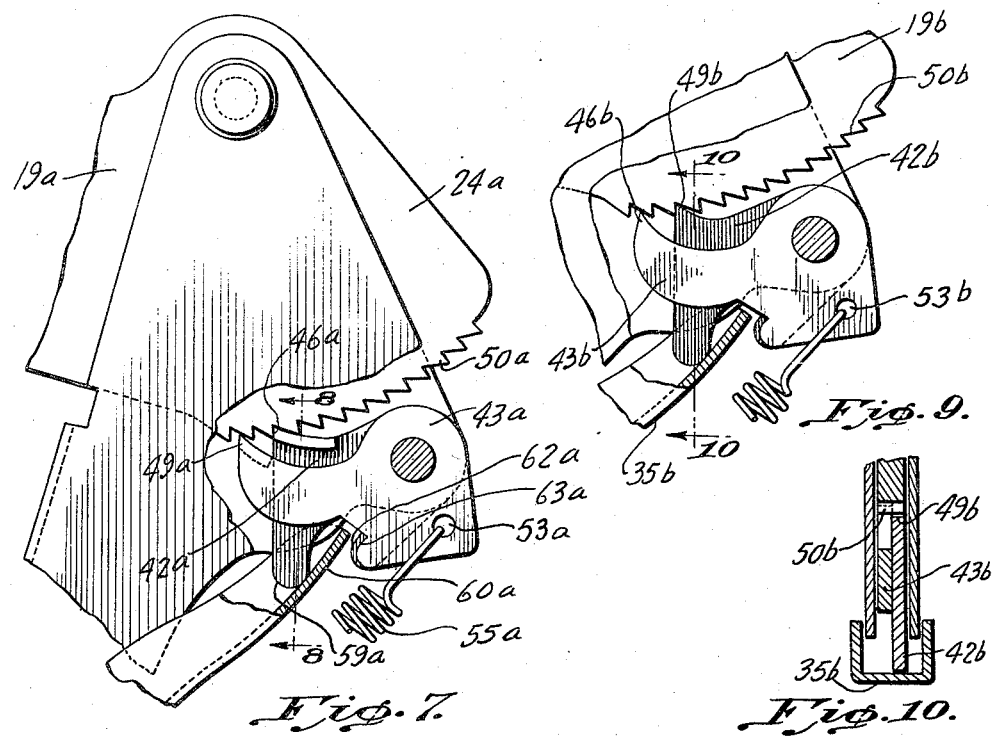
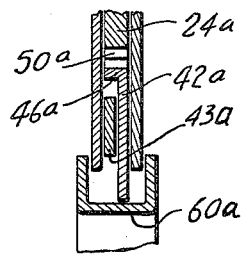
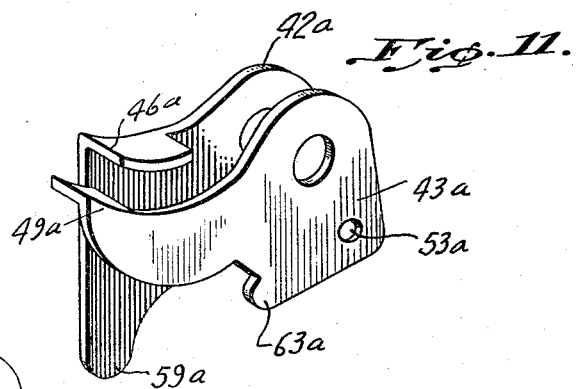
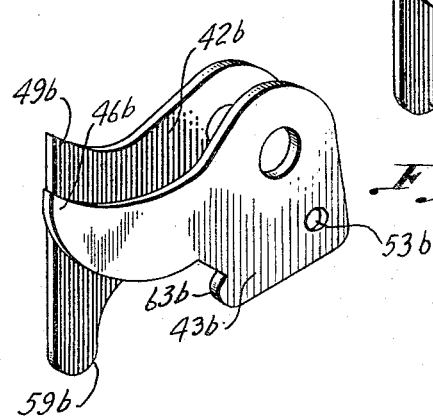
Inventor
Charles S. McCarthy
By Braselton, Whitcomb & Davies
Attorneys Patented Feb. 6, 1940

2,189,268

UNITED STATES PATENT OFFICE 2,189,268

MECHANISM CONTROL

Charles S. McCarthy, Toledo, Ohio, assignor to The Logan Gear Company, Toledo, Ohio, a corporation of Ohio Application July 12, 1937, Serial No. 153,149

8 Claims. (Cl. 74—536)

This invention relates to control mechanism and particularly to a lever mechanism of a type especially adapted for vehicle control or other apparatus.

The invention embraces the provision of a lever mechanism embodying a positively acting clutching means wherein the mechanism may be adjusted and retained in any desired position.

An object of the invention resides in the provision of a multiple pawl mechanism operating upon a clutching surface having comparatively large teeth, the pawls arranged to retain the lever in a large number of adjusted positions without a decrease in the tooth size of clutching surface.

Still another object of the invention is the provision of a multiple pawl mechanism cooperating with a toothed rack whereby a single spring is so arranged as to urge the pawls toward engaging position with the rack.

Still another object of the invention is the provision of a simple yet effective means for increasing the number of adjusted positions to which the brake operating lever mechanism having a pawl retaining means may be retained without decreasing the spacing between or size of the rack teeth.

A further object of the invention is the provision of an emergency brake control lever system arranged to be mounted at the rear of the instrument panel of a vehicle in a convenient position to be manipulated by the vehicle operator and capable of adjustment to a large number of brake setting positions so that the brakes may be brought to a proper "set" without undue force being exerted upon the lever mechanism.

Another object of the invention resides in a dual pawl clutch and lever arrangement which is inexpensive to manufacture and in which the major elements are fabricated of sheet metal in such a manner as to readily enhance the interchangeability of parts and which are a character capable of being made in large quantities in production.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is a fragmentary side elevational view of the forward portion of an automotive vehicle, part of the side wall being broken away to illustrate a method of mounting the mechanism control arrangement of my invention;

Figure 2 is a side elevational view of one form of mechanism control of my invention;

Figure 3 is an isometric perspective view of the pawl arrangement of one form of my invention;

Figure 4 is a top plan view of the pawl mechanism illustrated in Figure 3;

Figure 5 is a sectional view taken substantially on the line 5—5 of Figure 2;

Figure 6 is a horizontal sectional view taken substantially on the line 6—6 of Figure 2;

Figure 7 is a view showing another form of the invention;

Figure 8 is a sectional view taken substantially on the line 8—8 of Figure 7;

Figure 9 is a view showing another form of the pawl mechanism of my invention;

Figure 10 is a sectional view taken substantially on the line 10—10 of Figure 9;

Figure 11 is an isometric view of the pawl mechanism illustrated in Figure 7;

Figure 12 is an isometric view of the pawl arrangement illustrated in Figure 9.

While I have illustrated a mechanism control of my invention especially utilized as a means of emergency brake control for automotive vehicles, it is to be understood that I contemplate the incorporation of the invention in any type of mechanism where the control may be found to have utility.

Referring to the drawings in detail and particularly Figure 1, there is illustrated a forward portion 10 of an automotive vehicle body of conventional design having a cowl portion 11, dash portion 12, toe board 13, instrument panel 14, and steering post or column 15. With the arrangement of my invention, the brake control mechanism may be mounted in such a manner that the same may be conveniently operated by the driver of the vehicle and yet be in a position which will not impede or handicap the operator. With the conventional left hand drive vehicle, the control mechanism is preferably mounted adjacent the left side wall of the vehicle body as viewed from the driver's position. The arrangement is inclusive of a support or bracket 19, the latter being secured to the cowl frame construction 20 or other suitable part of the vehicle. The lever support as illustrated is mounted rearwardly of the dash board yet forwardly of the instrument panel 14 and is held in place by suitable securing means as, for example, rivets 21.

The bracket 19 in the present embodiment of the invention forms the supporting means for the lever arrangement. The lever mechanism is inclusive of a lever or lever member 25 preferably formed of sheet metal and which is pivotally connected to the support 19 by means of a headed stub shaft or pin 26, the support being preferably provided with a uniplanar portion 24. The body portion of the lever member is generally of U-shaped configuration in cross section and terminates at its upper extremity in a pair of parallel side walls or projections 29 and 30 which are adapted to straddle the uniplanar portion 24. The lever member 25 is provided with an opening which receives a pin 31 passing through a clevis member 32 which in turn is connected to a cable 33 carried in a sheath 36, the cable being adapted to be operatively connected to the emergency brakes of the vehicle.

The side walls of the body portion of the lever member are provided with registering openings to receive a pin 34 upon which is pivotally connected the clutch or pawl actuating or releasing member 35, the latter formed of sheet metal and preferably of U-shaped cross section, which configuration lends strength and rigidity to the member. The side walls of the lever member and clutch actuating member preferably overlap as illustrated so that they occupy less space and present a construction of pleasing appearance, as well as to facilitate connecting the lever and clutch actuating member together by means of pin 34. The lower end of the lever member is provided with a hand grip portion 38 and the clutch actuating member 35 terminates at its lower extremity in a finger piece 39 for convenience of operation.

The projecting side wall portions 29 and 30 of the lever member are provided with registering openings to receive a pin or stub shaft 40 which carries the clutch or pawl mechanism. In the embodiment illustrated in Figures 2 to 4 inclusive, this clutch mechanism is inclusive of two pawls 42 and 43, both journalled upon the pin 40. The pawl 42 is of U-shaped configuration having a connecting or bridge portion 45 which terminates in a pawl tooth 46, this pawl having parallel side wall portions 47 and 48 which are spaced apart to accommodate the pawl 43. The pawl 43 is formed of sheet metal and has a pawl tooth 49 as illustrated, which is out of alignment with the pawl tooth 46. The side wall projections 29 and 30 of the lever member are embossed outwardly as at 27 to accommodate the dual pawl mechanism. As illustrated, it is desirable to accomplish the novel results of the invention to have the pawl teeth spaced apart a distance unequal to the spacing between the clutch or ratchet teeth 50 formed upon the support 19 and with which the pawl teeth are adapted for cooperation. As particularly illustrated in Figure 2 in this embodiment of the invention, the pawl teeth have been spaced apart a distance equal to the spacing of one and one-half of the ratchet or clutch teeth 50 on the support. The pawls are so arranged that each may, when in the proper position with respect to teeth on the sector or support, move into full engagement with a tooth so as to hold the lever mechanism in proper brake setting position. In the embodiment illustrated in Figure 2, the pawl 43 is provided with a projecting portion 52 provided with an opening 53 adapted to receive the hook-like extremity 54 of the spring 55, the other end of the spring having a hook-like portion 56 which enters an opening 57 in the clutch actuating member 35. The U-shaped pawl member 42 has its wall portions formed with parallel aligned projections 59 which are adapted to be engaged by an end portion 60 of the clutch or pawl actuating member 35 as particularly illustrated in Figure 2. It is to be noted that the point of connection of the spring 55 with the clutch actuating member 35 is below the pin 34 which connects the clutch actuating member to the lever member so that the spring not only urges the pawl tooth 40 of pawl member 43 in a clockwise direction toward engagement with the teeth 50 of the support, but through the medium of the clutch actuating member 35, the spring urges the inner surface of the end portion 60 of the clutch actuating member 35 into engagement with the projections 59 of pawl 42 and thus urges pawl tooth 46 toward engagement with the clutch teeth 50 in the support. By this arrangement, a single spring urges both pawls toward engagement with the toothed clutching surface.

The pawl 42 is also provided with depending projections 62, and pawl 43 is also provided with a depending projection 63 arranged adjacent the projections 62 which are adapted to be engaged by the outer surface of the end portion 60 of the clutch actuating member 35 when the finger piece 39 thereof is depressed by the vehicle operator. It is to be noted that there is a space or "lost motion" between the end 60 of the clutch actuating member 35 and the projections 62 and 63 as shown in Figure 2 so as to permit the pawls selectively to enter the proper recess or engage the proper teeth in the clutch surface of the support for retaining the lever in adjusted position. When, however, the finger piece 39 is depressed to move the clutch actuating member 35 around its pivot point 34, the extremity 60 engages projections 62 and 63 to thereby disengage both of the pawls from the teeth 50 in the support so that the lever may be moved to brake releasing position.

As the spacing between the teeth 46 and 49 of the pawls is different than the spacing between the teeth 50 of the support, a very fine adjustment of the lever mechanism to brake setting position may be had as the pawl in proper position to engage a tooth of the support will be urged by the spring 55 to such position, while the other pawl rides midway upon another tooth without being in clutching engagement with any of the teeth 50. Thus, there is possible in the arrangement of my invention twice the number of brake setting positions in which the brake setting mechanism may be positively held by the pawl or clutch mechanism as there are clutch teeth in the support. This is accomplished without reducing the size of the teeth 50 in the support, thus permitting the use of comparatively large teeth and greatly prolonging the life of the clutch mechanism.

Referring particularly to the form of the invention shown in Figures 7, 8, and 11, the pawls 42a and 43a are both formed of flat sheet metal. The pawl 42a is provided with a pawl tooth 46a formed by bending the metal laterally as particularly shown in Figures 7 and 11. The pawl tooth 49a of pawl 43a is also formed by bending the metal laterally. In this manner the surface of contact of the pawl teeth 49a and 46a are substantially the same width as the uniplanar portion 24a of the bracket or support 19a. In this form of the invention the pawl assembly is of substantially the same width as the uniplanar portion 24a and is therefore unnecessary to emboss the lever walls outwardly as illustrated in the form of the invention shown in Figure 2.

The pawl 42a is provided with a depending projection 59a which contacts with the inner surface of the extremity 60a of the clutch actuator 35a so that the pawl tooth 46a is urged into engagement with the teeth or clutching surface 50a under the influence of the spring 55a which is connected with pawl 43a, this part of the arrangement being similar to that shown in Figure 2. The pawls 42a and 43a are provided with projections 62a and 63a which are adapted when the pawls are to be released from engagement with the clutching surface to be engaged by the extremity 60a of the clutch actuator in the same manner as hereinbefore described in connection with the arrangement of the invention disclosed in Figure 2.

In the form of the invention shown in Figures 9, 10 and 12, the clutch mechanism is inclusive of a pair of pawls 42b and 43b which are uniplanar or flat in character, the teeth 46b and 49b of the pawls being of the same width as the body of the pawl and therefore each pawl tooth covering or adapted for engagement with one-half of the clutching surface 50b of the support 19b. In this form of the invention the pawl mechanism is urged into engagement with the stationary toothed clutch surface and the mechanism released by the clutch actuator 35b by the same arrangement as is illustrated and described in connection with the other forms of the invention.

It is apparent that within the scope of the invention, modifications and different arrangements may be made other than is herein disclosed, and the present disclosure is illustrative merely, the invention comprehending all variations thereof.

What I claim is:

1. A mechanism control including, in combination, a supporting plate formed of sheet metal and having a toothed lower edge; a lever formed of sheet metal and having portions at its upper end pivotally connected to said support above said toothed edge portion; said lever member terminating at its lower end in a hand grip portion; a plurality of pawls engageable with said toothed edge portion and carried by said lever; a pawl releasing member associated with said lever and adapted for engagement with both of said pawls; spring means engageable with said pawl releasing member and one of said pawls for normally urging both pawls into cooperative engagement with the toothed portion of said support.

2. A mechanism control including, in combination, an element having a uniplanar portion provided with a serrated clutching surface; a lever member formed of sheet metal pivotally secured to said element; a pin carried by said lever; a pair of toothed pawls pivotally supported upon said pin and adapted for cooperative engagement with said serrated clutching surface; a spring for urging both pawls toward said clutching surface; and a pawl releasing member having "lost motion" connection with said pawls and arranged to effect a disengagement of said pawls from the clutching surface.

3. A mechanism control including, in combination, a supporting element having a toothed clutching surface; a lever member formed of sheet metal having side wall portions straddling the support, said portions being pivotally connected to said support; a pair of pawls pivoted to said lever; a pawl releasing member formed of sheet metal pivoted to said lever member; and spring means engageable with one of said pawls and said pawl releasing member for normally urging both of said pawls into cooperative engagement with said clutching surface, said pawl releasing member having connection with said pawls whereby movement of said pawl releasing member disengages both of said pawls from the toothed clutching surface.

4. A mechanism control including, in combination, an element provided with a serrated clutching surface; a lever member pivotally secured to said element; a pair of pawls pivotally supported by said lever member; a pawl releasing member formed of sheet metal and pivotally supported by said lever; single spring means cooperating with one of said pawls and said pawl releasing member for urging both of said pawls into engagement with said clutching surface.

5. A mechanism control including, in combination, a support carrying a clutching surface having teeth formed thereon; a lever member articulated with said support; a pair of pawls pivotally supported upon said lever member and adapted for engagement with the clutching surface, one of said pawls being longer than the other by an amount equal to substantially one and one-half times the distance between successive teeth of the clutching surface; spring means engageable with one of said pawls for urging both of said pawls into engagement with the clutching surface; a pawl releasing member associated with the lever adapted for engagement with both of said pawls to disengage the latter from the clutching surface.

6. A mechanism control including, in combination, an element provided with a serrated clutching surface; a lever member pivotally secured to said element; a pair of pawls pivotally supported by said lever member on a common axis, the combined width of said pawls being substantially equal to the width of said clutching surface; a single spring for urging both of said pawls into engagement with said clutching surface, the teeth of said pawls being out of alignment and arranged to alternately engage teeth formed in the clutching surface; and means to disengage both of said pawls from the clutching surface.

7. A mechanism control including, in combination, an element provided with a serrated clutching surface; a lever member pivotally secured to said element; a pair of pawls pivotally supported by said lever member; a pawl actuating member pivotally supported by said lever; spring means for urging both of said pawls into engagement with said clutching surface; one of said pawls being formed of U-shaped configuration from sheet metal and adapted to straddle the other of said pawls, the teeth of said pawls being out of alignment and arranged to alternately engage teeth formed in the clutching surface.

8. A mechanism control including, in combination, a support carrying a toothed surface; a lever member; a pair of pawls supported by the lever member on a common axis, one of said pawls being of U-shaped configuration and adapted to straddle the other of said pawls; and a single spring for normally urging both of said pawls into engagement with the toothed surface.

CHARLES S. McCARTHY.